US012786331B2

(12) United States Patent
Shidara et al.

(10) Patent No.: US 12,786,331 B2
(45) Date of Patent: Nov. 3, 2026

(54) IMAGE PROCESSING SYSTEM, NON-TRANSITORY COMPUTER READABLE MEDIUM, AND METHOD FOR PROCESSING IMAGE

(71) Applicant: FUJIFILM Business Innovation Corp., Tokyo (JP)

(72) Inventors: Saki Shidara, Kanagawa (JP); Yushiro Tanaka, Kanagawa (JP); Seiji Shiraki, Kanagawa (JP); Masahiko Mizumura, Kanagawa (JP); Nagamasa Misu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/453,344

(22) Filed: Aug. 22, 2023

(65) Prior Publication Data

US 2024/0323290 A1 Sep. 26, 2024

(30) Foreign Application Priority Data

Mar. 24, 2023 (JP) ................................. 2023-049042

(51) Int. Cl.
*H04N 1/00* (2006.01)
*G06T 5/40* (2006.01)
*G06T 7/90* (2017.01)

(52) U.S. Cl.
CPC .......... *H04N 1/00803* (2013.01); *G06T 5/40* (2013.01); *G06T 7/90* (2017.01); *G06T 2207/10024* (2013.01)

(58) Field of Classification Search
None
See application file for complete search history.

(56) References Cited

U.S. PATENT DOCUMENTS 8,260,043 B2 9/2012 Kubota
2013/0315482 A1* 11/2013 Iwamoto ................ G06T 11/10 382/167

FOREIGN PATENT DOCUMENTS

JP 2006203582 * 8/2006 ............... H04N 1/46
JP 2006203583 * 8/2006 ............... H04N 1/40
JP 2006203584 * 8/2006 ............... H04N 1/40
JP 2009094903 4/2009

* cited by examiner

*Primary Examiner* — Beniyam Menberu
(74) *Attorney, Agent, or Firm* — JCIPRNET

(57) ABSTRACT

An image processing system includes an image reader that reads a document image and that generates image information regarding a CIELAB color space, and a processor configured to: obtain an a*b*-plane two-dimensional histogram for the image information; obtain a background color of the document image using the a*b*-plane two-dimensional histogram and count a number of black spots of the image information for each of bins of the a*b*-plane two-dimensional histogram; subtract the number of black spots in a bin determined to include the background color from a total number of black spots in all the bins; and determine, if an obtained value is larger than a predetermined threshold, that the document image indicates a non-blank sheet.

8 Claims, 20 Drawing Sheets

L* PIXEL COUNT TABLE

IMAGE PROCESSING SYSTEM, NON-TRANSITORY COMPUTER READABLE MEDIUM, AND METHOD FOR PROCESSING IMAGE

CROSS-REFERENCE TO RELATED APPLICATIONS

This application is based on and claims priority under 35 USC 119 from Japanese Patent Application No. 2023-049042 filed Mar. 24, 2023.

BACKGROUND

(i) Technical Field

The present disclosure relates to an image processing system, a non-transitory computer readable medium, and a method for processing an image.

(ii) Related Art

Japanese Unexamined Patent Application Publication No. 2009-094903 discloses an image processing apparatus that determines, on the basis of image data including plural pixels, whether the image data is a plain image. The image processing apparatus includes a determination unit that determines whether the image data indicates a plain image by comparing a feature value calculated from the image data with a threshold and a setting unit that receives a reading method employed when image data is read from a document and/or an output method employed when image data is output through printing and that sets the threshold used for the determination in accordance with the input method.

SUMMARY

When a processor determines whether a document image indicates a blank sheet by obtaining, from image information regarding a red, green, and blue (RGB) color space, histograms of maximum values and histograms of maximum differences of RGB, the processor undesirably determines a non-blank sheet as a blank sheet if all the maximum values and all the maximum differences of RGB are the same, even if a color of letters or a pattern is different from a background color of a document. A "blank sheet" refers to a plain document without letters or patterns.

Aspects of non-limiting embodiments of the present disclosure relate to improvement in accuracy of a determination whether a document image indicates a non-blank sheet, compared to when the determination is made by obtaining histograms of maximum values and histograms of maximum differences of RGB from image information regarding an RGB color space.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing system including an image reader that reads a document image and that generates image information regarding a CIELAB color space, and a processor configured to: obtain an a*b*-plane two-dimensional histogram for the image information; obtain a background color of the document image using the a*b*-plane two-dimensional histogram and count a number of black spots of the image information for each of bins of the a*b*-plane two-dimensional histogram; subtract the number of black spots in a bin determined to include the background color from a total number of black spots in all the bins; and determine, if an obtained value is larger than a predetermined threshold, that the document image indicates a non-blank sheet.

BRIEF DESCRIPTION OF THE DRAWINGS

An exemplary embodiment of the present disclosure will be described in detail based on the following figures, wherein.

DETAILED DESCRIPTION

Figure 1:
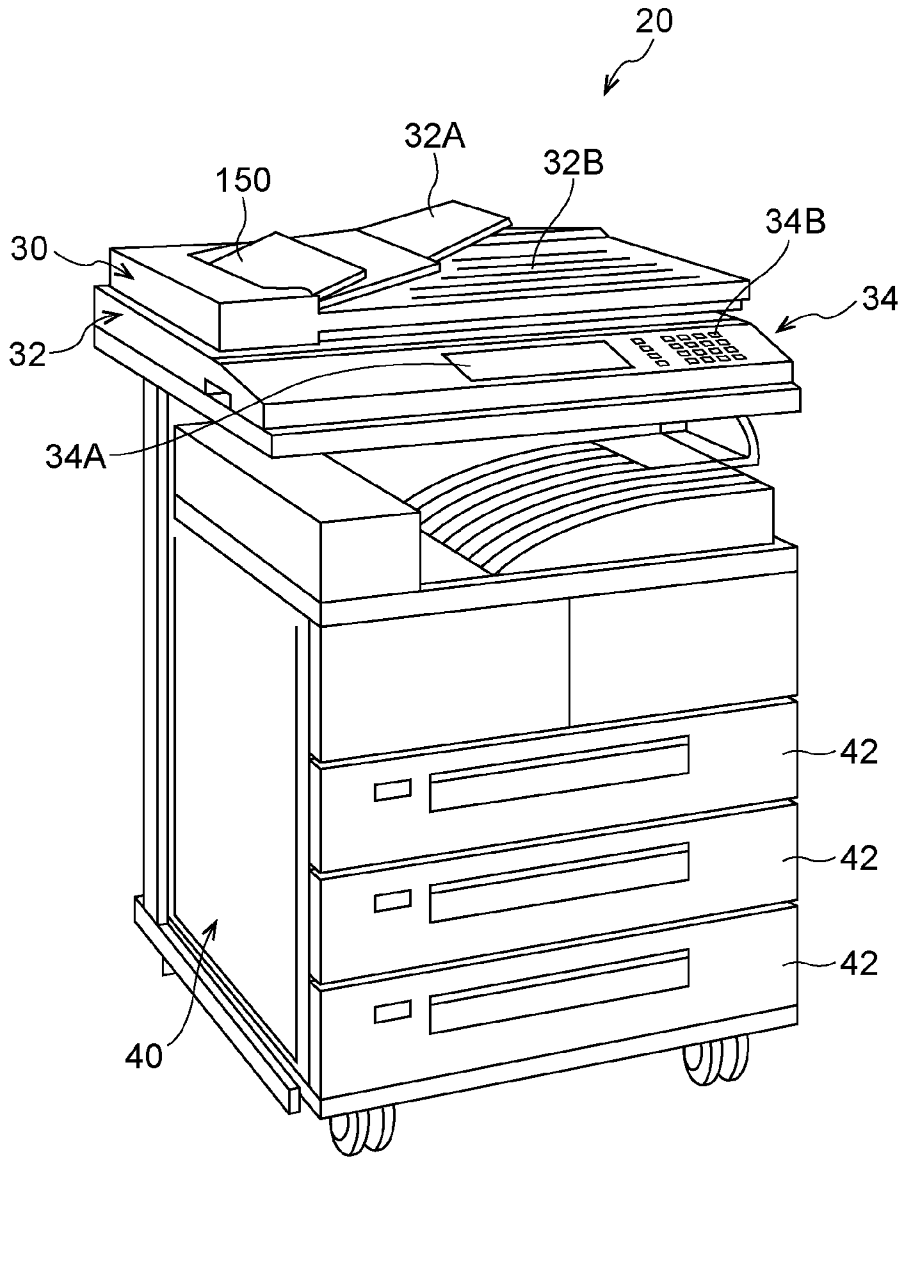
FIG. 1 is a perspective view illustrating the appearance of an image forming apparatus, which is an example of an image forming system according to an exemplary embodiment.

An exemplary embodiment of the present disclosure will be described in detail hereinafter with reference to the drawings. In the present exemplary embodiment, an image forming apparatus will be described as an example of an image processing system. FIG. 1 is a perspective view illustrating the appearance of an image forming apparatus 20 according to the present exemplary embodiment. The image forming apparatus 20 according to the present exemplary embodiment has a printing function for receiving various pieces of data through a communication link such as a network and performing a process for forming an image on the basis of the received pieces of data. The image forming apparatus 20 according to the present exemplary embodiment also has plural functions such as a reading function for reading a document and obtaining image information indicating the document, a copying function for copying images recorded on a document onto sheets of paper, a facsimile function for communicating various pieces of data through a telephone line, which is not illustrated, a transfer function for transferring document information, such as image information, read by the reading function or the like, and an accumulation function for accumulating read document information, such as image information.

The image forming apparatus 20 according to the present exemplary embodiment includes a document reading unit 30 as an example of an image reader, and an image forming unit 40 is provided below the document reading unit 30. The document reading unit 30 includes a document conveying unit (not illustrated) in a document cover 32. The document conveying unit sequentially draws a document 150 set on a document feeding unit 32A provided for the document cover 32 and feeds the document 150 onto a platen glass (not illustrated). The document reading unit 30 reads images recorded on the fed document 150. The document conveying unit then discharges the document 150 from which the images have been read onto a document discharge unit 32B provided for the document cover 32. The document reading unit 30 generates image information regarding a CIELAB color space from the read images recorded on the document 150.

The document reading unit 30 is provided with a user interface 34 that receives various operations from a user. The user interface 34 includes a display 34A on which display buttons for receiving operations using a software program and various pieces of information are displayed and hardware keys 34B such as a numeric keypad. The display 34A is a touch panel where a display device such as a liquid crystal panel and a position input device such as a touchpad are combined together. The user interface 34, which includes the display buttons on the display 34A and the hardware keys 34B, is used to set the number of copies and magnification for the copying function and dial a phone number for the facsimile function. The hardware keys 34B may be omitted.

The image forming unit 40 includes sheet storage units 42 storing sheets of paper that serve as a recording medium for forming images. The image forming unit 40 takes out the sheets stored in the sheet storage units 42 one by one and forms images based on image data on the sheets through, for example, electrophotography. The image forming unit 40 then discharges, to a discharge unit, which is not illustrated, the sheets on which the images have been formed.

Figure 2:
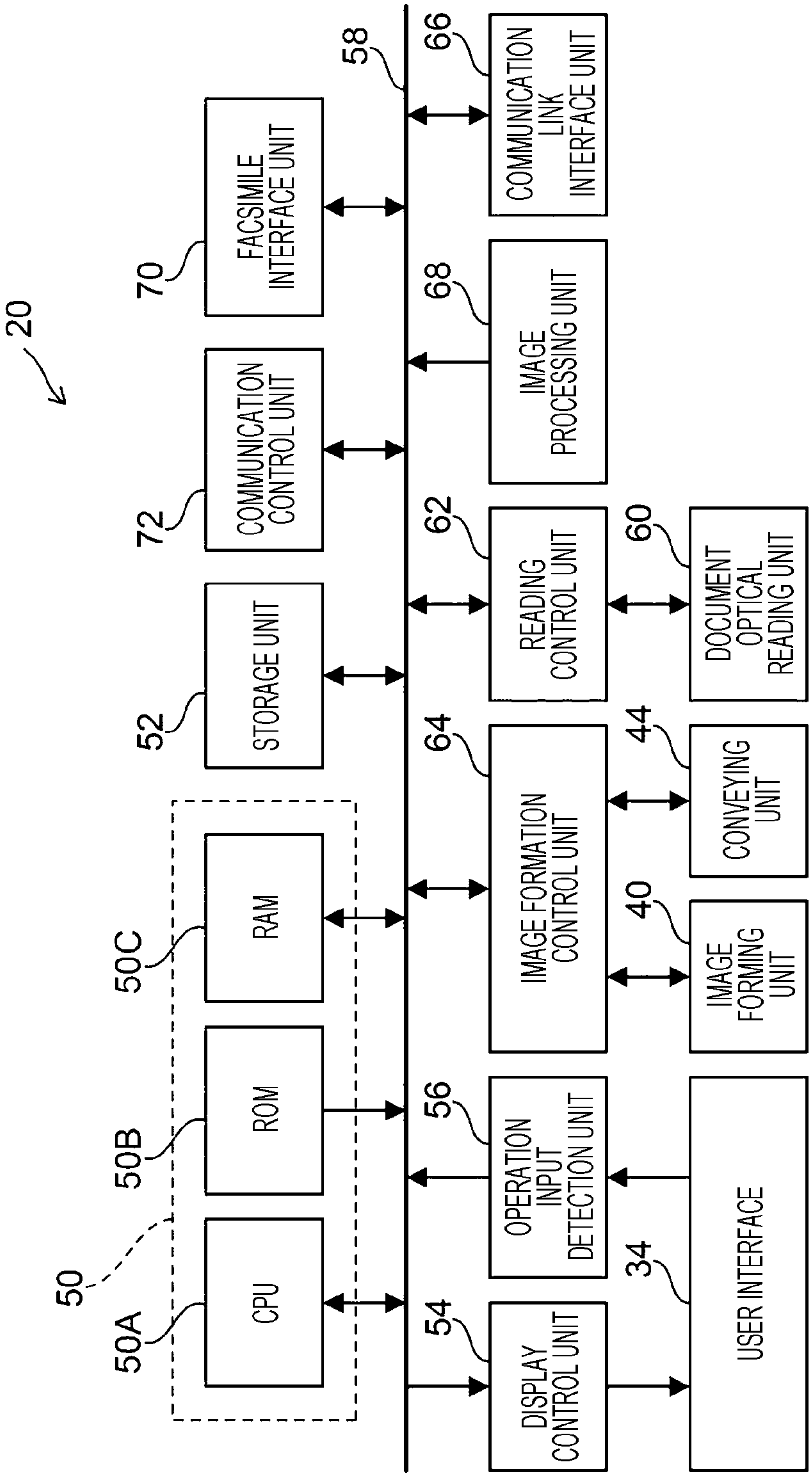
FIG. 2 is a block diagram illustrating the configuration of an electrical system of the image forming apparatus, which is an example of the image forming system according to the exemplary embodiment.

FIG. 2 is a block diagram illustrating the configuration of an electrical system of the image forming apparatus 20 according to the present exemplary embodiment.

As illustrated in FIG. 2, the image forming apparatus 20 according to the present exemplary embodiment includes a control unit 50 including a central processing unit (CPU) 50A, a read-only memory (ROM) 50B, and a random-access memory (RAM) 50C. The CPU 50A controls operation of the entirety of the image forming apparatus 20. The RAM 50C is used, for example, as a work area when the CPU 50A executes various programs. The ROM 50B stores in advance various control programs such as a program for processing an image, various parameters, and the like. In the image forming apparatus 20, the components of the control unit 50 are electrically connected to one another through a system bus 58.

The image forming apparatus 20 according to the present exemplary embodiment also includes a storage unit 52 storing various pieces of data, application programs, and the like. The image forming apparatus 20 includes a display control unit 54 that is connected to the user interface 34 and that controls display of various operation screens and the like on the display 34A of the user interface 34. The image forming apparatus 20 also includes an operation input detection unit 56 that is connected to the user interface 34 and that detects operations input through the user interface 34. In the image forming apparatus 20, the storage unit 52, the display control unit 54, and the operation input detection unit 56 are electrically connected to the system bus 58. The storage unit 52 may be, for example, a hard disk drive (HDD) or a nonvolatile storage unit such as a flash memory.

The image forming apparatus 20 according to the present exemplary embodiment also includes a reading control unit 62 that controls an operation for optically reading an image performed by a document optical reading unit 60 and an operation for feeding a document performed by the document conveying unit and an image formation control unit 64 that controls a process for forming an image performed by the image forming unit 40 and conveyance of sheets to the image forming unit 40 performed by a conveying unit 44.

The image forming apparatus 20 also includes a communication link interface unit 66 that is connected to the communication link, which is not illustrated, and that communicates communication data with external apparatuses connected to the communication link, such as servers, and an image processing unit 68 that performs various types of image processing. The image forming apparatus 20 also includes a facsimile interface unit 70 that is connected to the telephone line, which is not illustrated, and that communicates facsimile data with facsimile apparatuses connected to the telephone line. The image forming apparatus 20 also includes a communication control unit 72 that controls communication of facsimile data through the facsimile interface unit 70. In the image forming apparatus 20, the communication control unit 72, the reading control unit 62, the image formation control unit 64, the communication link interface unit 66, the facsimile interface unit 70, and the image processing unit 68 are electrically connected to the system bus 58.

With the above configuration, the image forming apparatus 20 according to the present exemplary embodiment accesses the RAM 50C, the ROM 50B, and the storage unit 52 using the CPU 50A. The image forming apparatus 20 also controls, using the CPU 50A, display of information such as operation screens and various messages on the display 34A of the user interface 34 through the display control unit 54. The image forming apparatus 20 also controls operation of the document optical reading unit 60 and the document conveying unit through the reading control unit 62. The image forming apparatus 20 also controls, using the CPU 50A, operation of the image forming unit 40 and the conveying unit 44 through the image formation control unit 64 and the communication of communication data through the communication link interface unit 66. The image forming apparatus 20 controls, using the CPU 50A, the communication of facsimile data performed by the communication control unit 72 through the facsimile interface unit 70. The image forming apparatus 20 also detects, using the CPU 50A, operations performed on the user interface 34 on the basis of operation information detected by the operation input detection unit 56 and performs various types of control based on the operations.

Figure 3:
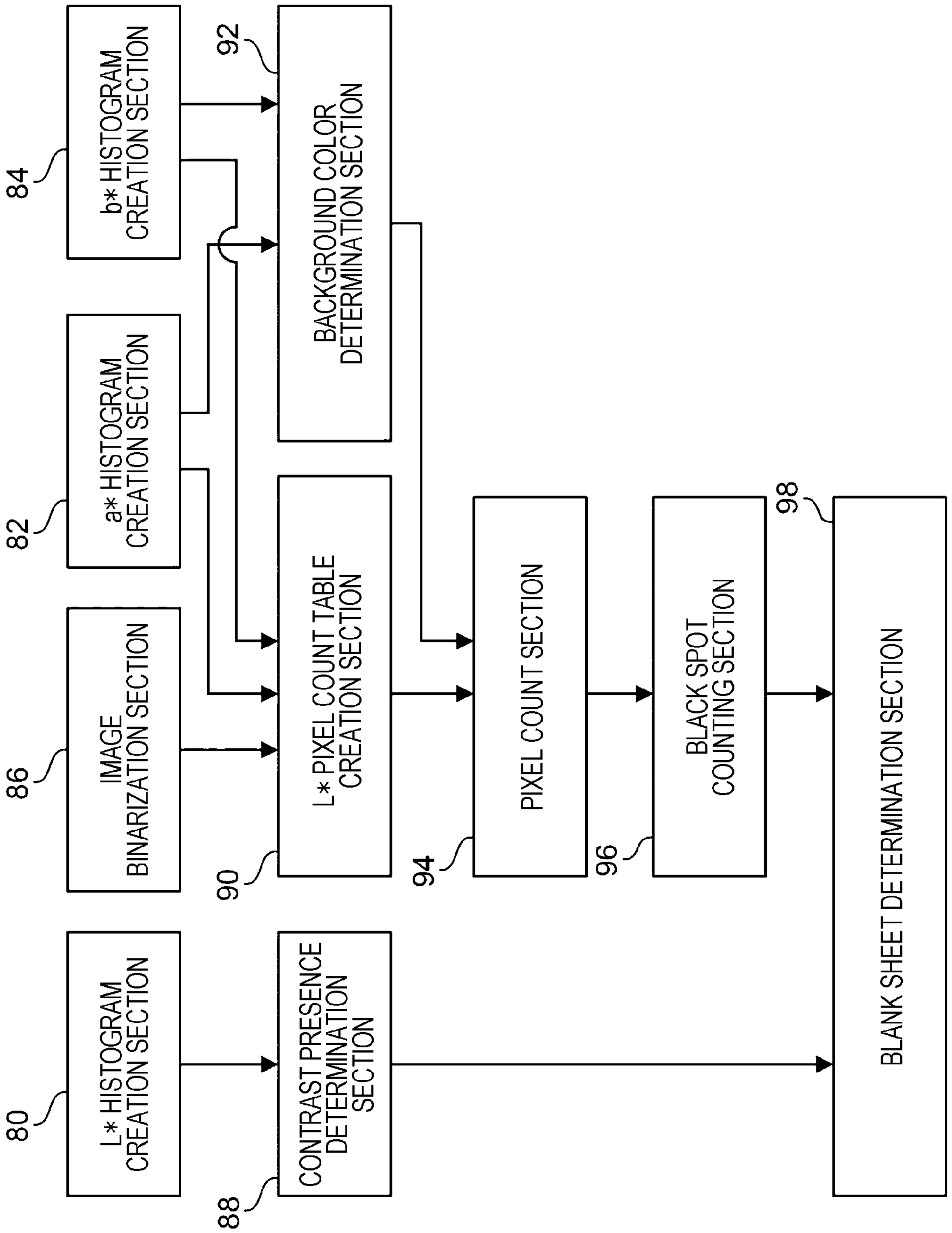
FIG. 3 is a functional block diagram illustrating an example of the functional configuration of a control unit of the image forming apparatus, which is an example of the image forming system according to the exemplary embodiment.

Next, a functional configuration that the CPU 50A of the control unit 50 achieves in the image forming apparatus 20 according to the present exemplary embodiment by loading a program stored in the ROM 50B into the RAM 50C and executing the program. FIG. 3 is a functional block diagram illustrating an example of the functional configuration of the control unit 50 of the image forming apparatus 20 according to the present exemplary embodiment.

The control unit 50 has functions of an L* histogram creation section 80, an a* histogram creation section 82, a b* histogram creation section 84, an image binarization section 86, a contrast presence determination section 88, an L* pixel count table creation section 90, a background color determination section 92, a pixel counting section 94, a black spot counting section 96, and a blank sheet determination section 98. Although the functional configuration illustrated in FIG. 3 will be described as the functions of the control unit 50 in the present exemplary embodiment, the functional configuration illustrated in FIG. 3 may be, for example, that of the image processing unit 68, instead.

Figure 4A:
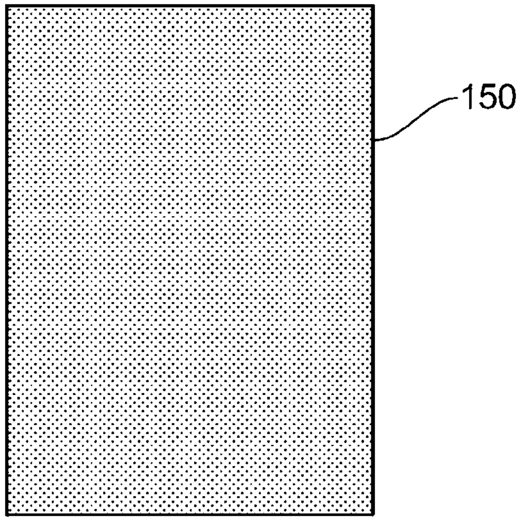
FIG. 4A is a diagram illustrating an example of a document to be read.
Figure 4B:
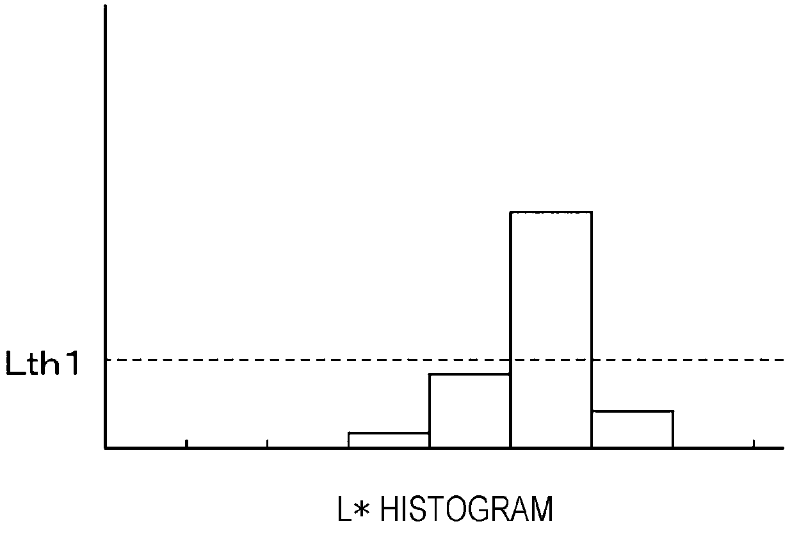
FIG. 4B is an L* histogram obtained from image information regarding a CIELAB color space obtained by reading the document illustrated in FIG. 4A.

The L* histogram creation section 80 obtains an L* histogram for image information regarding a CIELAB color space obtained by reading a document image using the document optical reading unit 60. For example, the L* histogram creation section 80 creates an L* histogram illustrated in FIG. 4B from image information regarding a CIELAB color space obtained by reading the document 150 illustrated in FIG. 4A. A threshold Lth1 illustrated in FIG. 4B is a frequency threshold for determining a peak in the L* histogram. That is, a part of the L* histogram that exceeds the threshold Lth1 is determined as a peak.

The L* histogram created by the L* histogram creation section 80 is a histogram where a frequency is the number of pixels in each of predetermined intervals (bins) for L* in the image information regarding the CIELAB color space.

The a* histogram creation section 82 obtains an a* histogram for image information regarding a CIELAB color space. For example, the a* histogram creation section 82 creates an a* histogram illustrated in FIG. 4C from the image information regarding the CIELAB color space obtained by reading the document 150 illustrated in FIG. 4A.

The a* histogram created by the a* histogram creation section 82 is a histogram where the frequency is the number of pixels in each of predetermined intervals (bins) for a* in the image information regarding the CIELAB color space.

The b* histogram creation section 84 obtains a b* histogram for image information regarding a CIELAB color space. For example, the b* histogram creation section 84 creates a b* histogram illustrated in FIG. 4C from the image information regarding the CIELAB color space obtained by reading the document 150 illustrated in FIG. 4A.

The b* histogram created by the b* histogram creation section 84 is a histogram where the frequency is the number of pixels in each of intervals (bins) for b* in the image information regarding the CIELAB color space.

The bins in the L*, a*, and b* histograms are optimally set in advance through an experiment or the like. In the L*, a*, and b* histograms, the number of bins may be different from each other. The number of bins in the a* and b* histograms, however, needs to be the same.

The image binarizing section 86 binarizes image information regarding a CIELAB color space.

The contrast presence determination section 88 determines presence or absence of a contrast in image information regarding a CIELAB color space using an L* histogram. More specifically, if the L* histogram includes two or more peaks that exceed the predetermined threshold Lth1, the contrast presence determination section 88 determines that there is a contrast. In other words, if there is one peak that exceeds the threshold Lth1 in the L* histogram, the contrast presence determination section 88 determines that there is no contrast. Even if the frequency of a bin adjacent to a bin including a peak exceeding the threshold Lth1 exceeds the threshold Lth1, the number of peaks is counted as one.

The L* pixel count table creation section 90 creates an L* pixel count table, which is an example of an a*b*-plane two-dimensional histogram. That is, the L* pixel count table creation section 90 creates the L* pixel count table, which is an example of the a*b*-plane two-dimensional histogram, from obtained a* and b* histograms. The L* pixel count table is divided into areas corresponding to bins of the a* and b* histograms and has a function of holding the number of black spots counted by the pixel counting section 94 for each area. In the present exemplary embodiment, each area of the a*b*-plane two-dimensional histogram (L* pixel count table) will be referred to as a "bin area". These bin areas are an example of bins of the a*b*-plane two-dimensional histogram in the present disclosure.

Figure 4C:
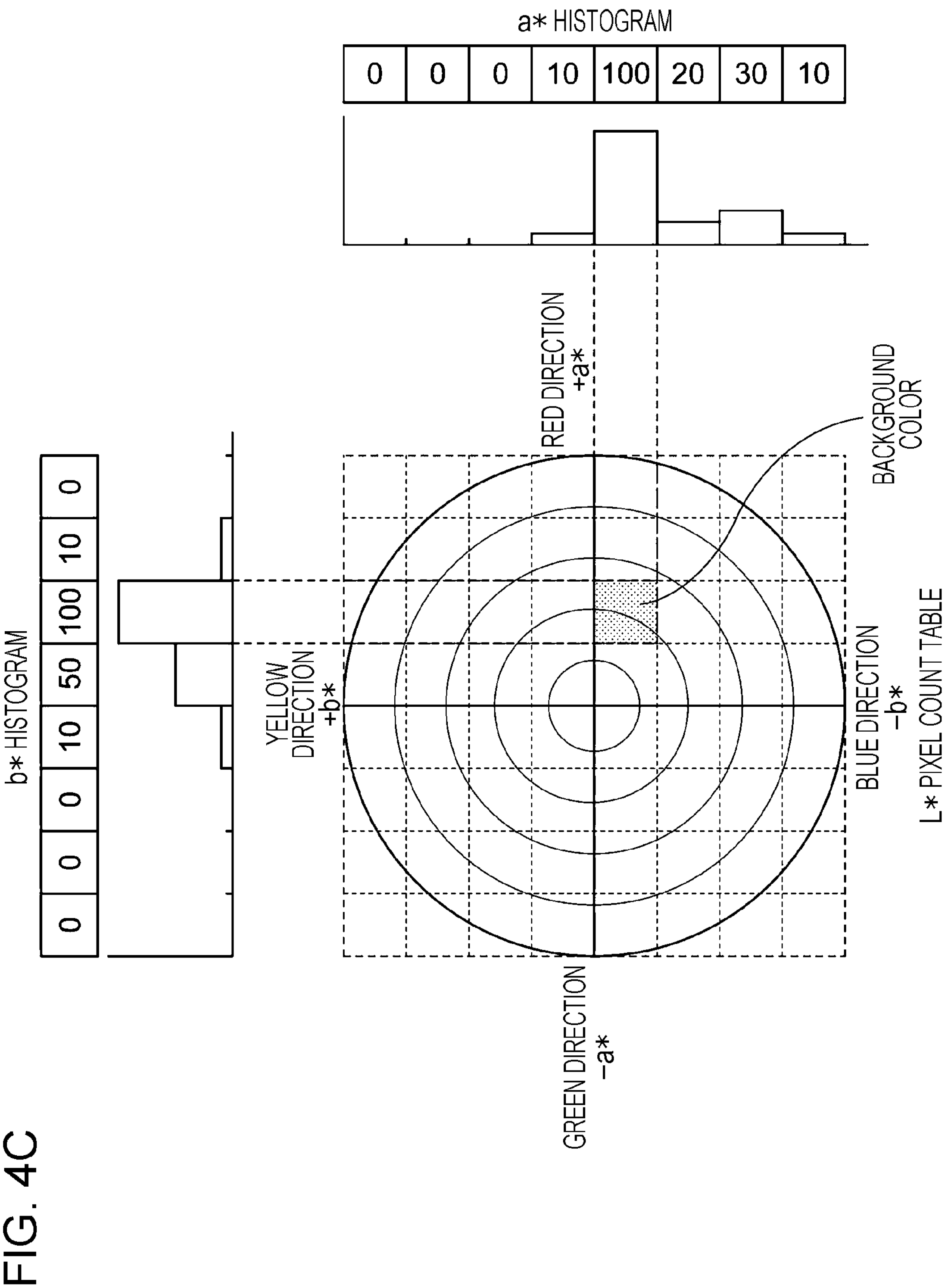
FIG. 4C is a diagram illustrating an a*b*-plane two-dimensional histogram and an L* pixel count table obtained from the image information regarding the CIELAB color space of the read document.

The background color determination section 92 obtains a background color of a document image using an L* pixel count table (a*b*-plane two-dimensional histogram). More specifically, as illustrated in FIG. 4C, the background color determination section 92 determines, as a background color of a document image, a color included in a bin area of an L* pixel count table located at an intersection between a highest peak of an a* histogram and a highest peak of a b* histogram.

Figure 4D:
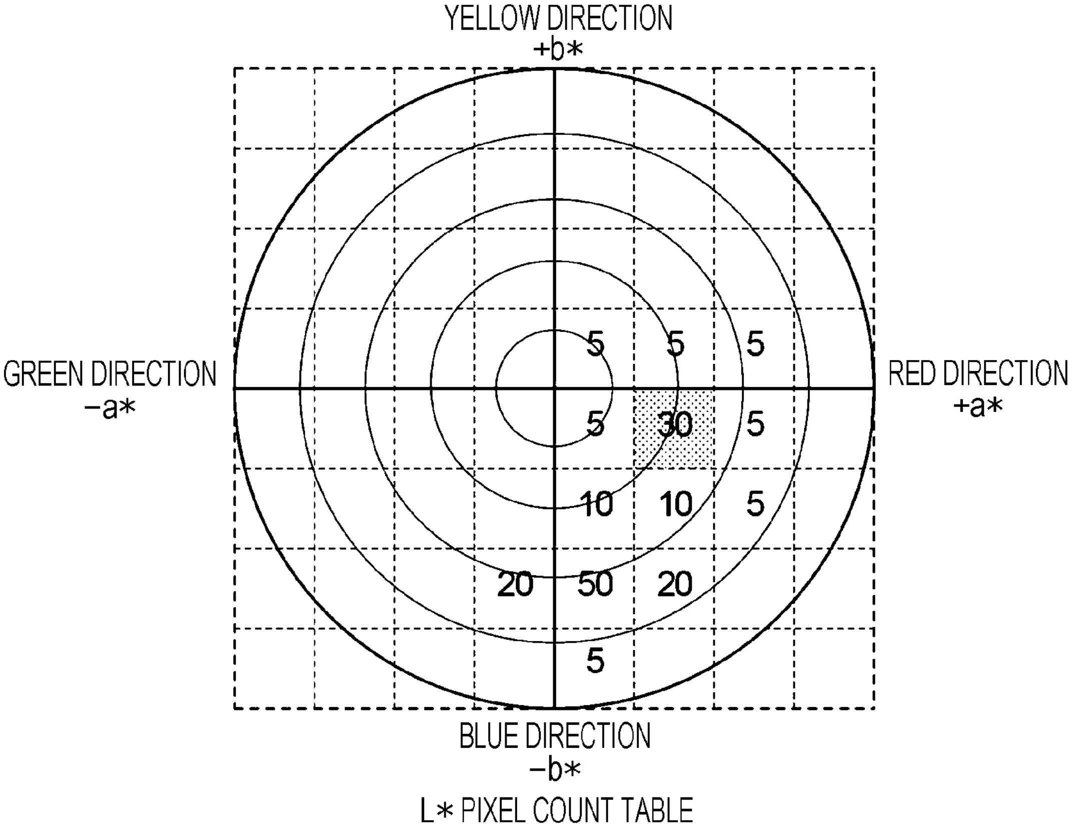
FIG. 4D is a diagram illustrating a state where the L* pixel count table illustrated in FIG. 4C holds the number of black spots counted for each of a*b* areas.

The pixel counting section 94 counts the number of black spots on the basis of a binary image obtained by the image binarizing section 86 and causes a corresponding bin area of an L* pixel count table to hold the number of black spots (refer to FIG. 4D). The number of black spots held by the bin area of the L* pixel count table is stored, for example, in a RAM 20C. FIG. 4D illustrates a case where 30 black spots have been counted in a bin area determined to include a background color. In the present disclosure, a color of black spots is not limited to black, and "black spots" refer to any pixels where pixel values exist.

The black spot counting section 96 subtracts, in an L* pixel count table, the number of black spots in a bin area determined to include a background color from the total number of black spots in all bin areas. The black spot counting section 96 then determines whether an obtained value is larger than a threshold Cth.

The blank sheet determination section 98 has a function of determining whether the document 150 is a blank sheet or a non-blank sheet. More specifically, if the contrast presence determination section 88 determines that there is a contrast and/or the obtained value is larger than the predetermined threshold Cth, the blank sheet determination section 98 determines that a document image indicates a non-blank sheet.

If the contrast presence determination section 88 determines that there is no contrast and the obtained value is smaller than or equal to the threshold Cth, on the other hand, the blank sheet determination section 98 determines that a document image indicates a blank sheet.

Figure 5A:
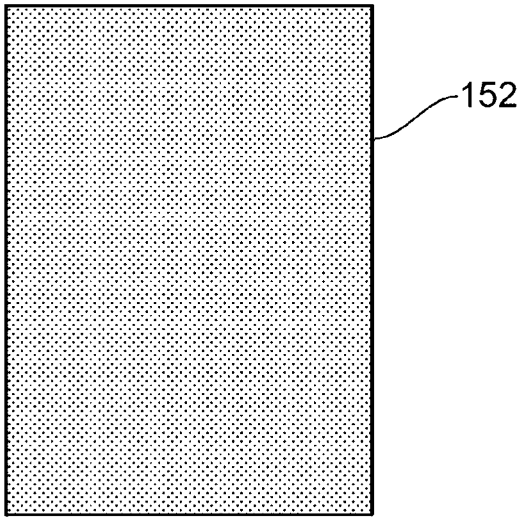
FIG. 5A is a diagram illustrating another example of the document to be read.
Figure 5B:
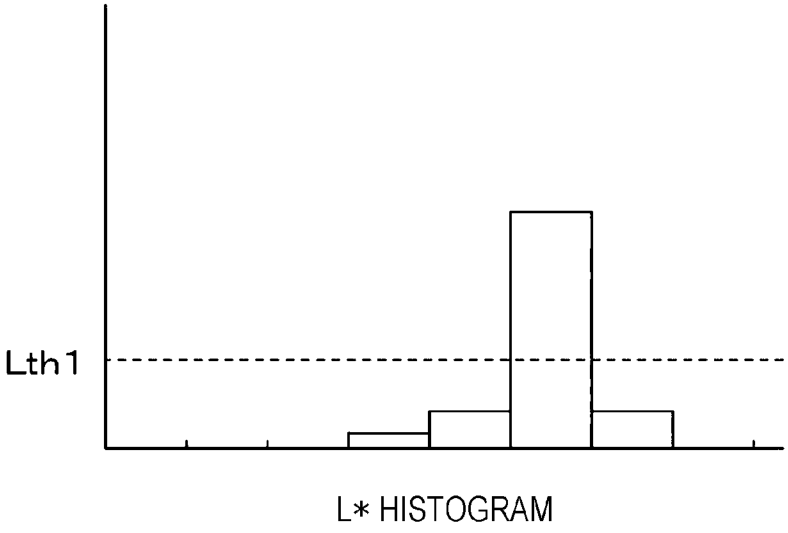
FIG. 5B is an L* histogram obtained from image information regarding a CIELAB color space obtained by reading the document illustrated in FIG. 5A.
Figure 5C:
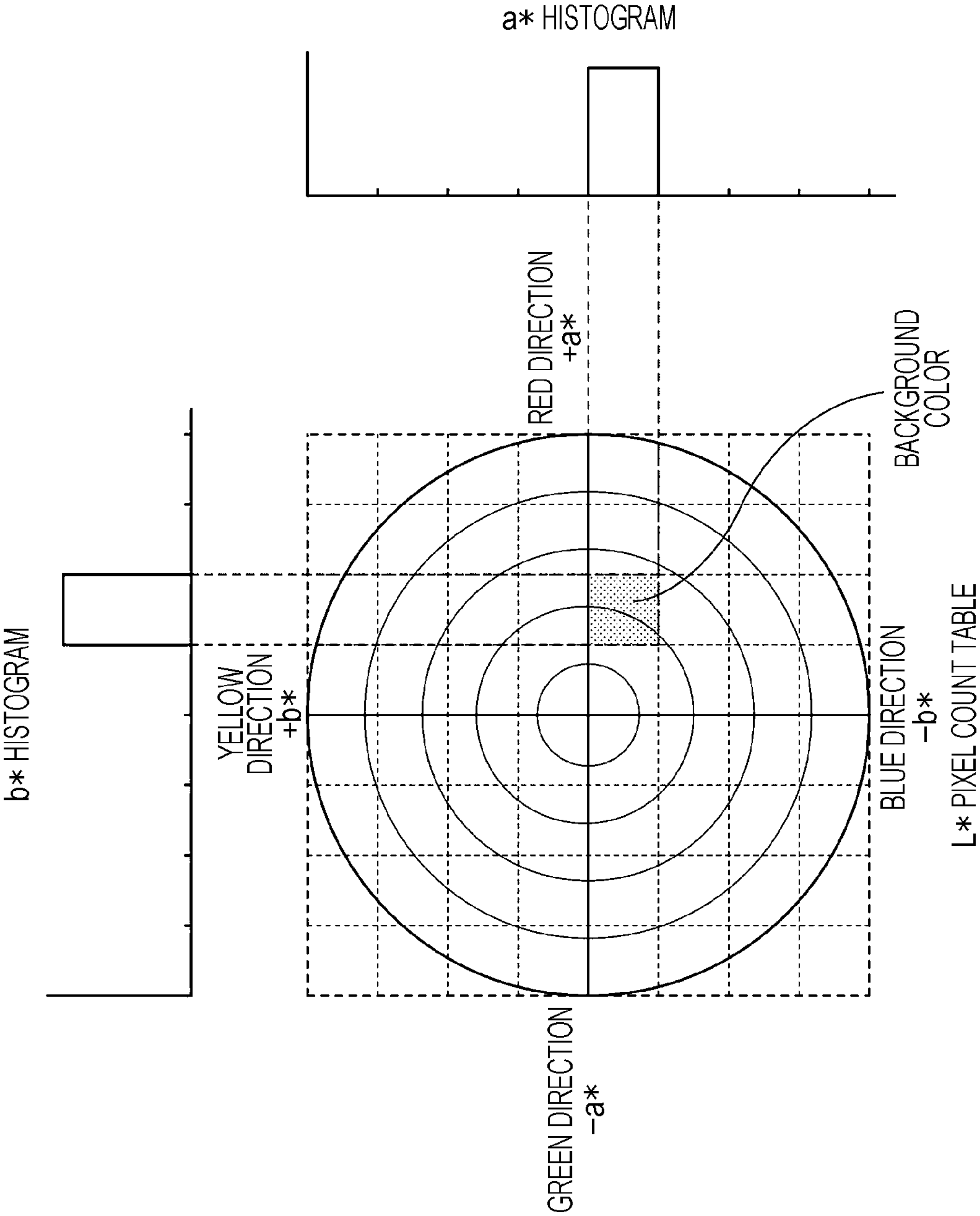
FIG. 5C is a diagram illustrating an a*b*-plane two-dimensional histogram and an L* pixel count table obtained from the image information regarding the CIELAB color space of the read document.

When a document 152 is a colored blank sheet (e.g., a pink sheet) as illustrated in FIG. 5A, for example, the number of peaks that exceed the threshold Lth1 in the L* histogram is one as illustrated in FIG. 5B. As illustrated in FIG. 5C, a background color is obtained from an intersection in the L* pixel count table between a highest peak of the a* histogram and a highest peak of the b* histogram. The number of black spots in a bin area determined to include the background color is then subtracted from the total number of black spots in all bin areas. Because an obtained value is smaller than or equal to the predetermined threshold Cth in the document 152, the blank sheet determination section 98 of the control unit 50 determines that the document 152 is a blank sheet.

Figure 6A:
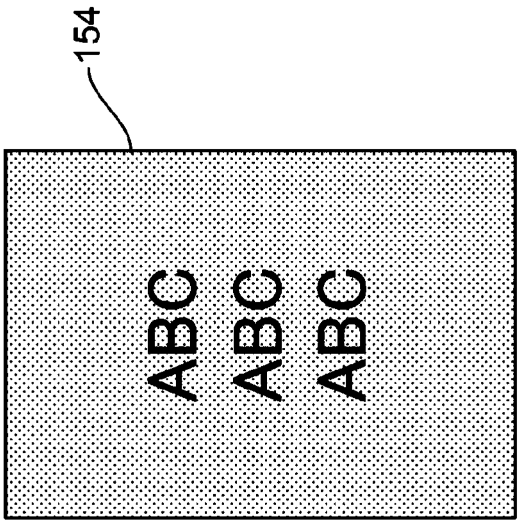
FIG. 6A is a diagram illustrating another example of the document to be read.
Figure 6B:
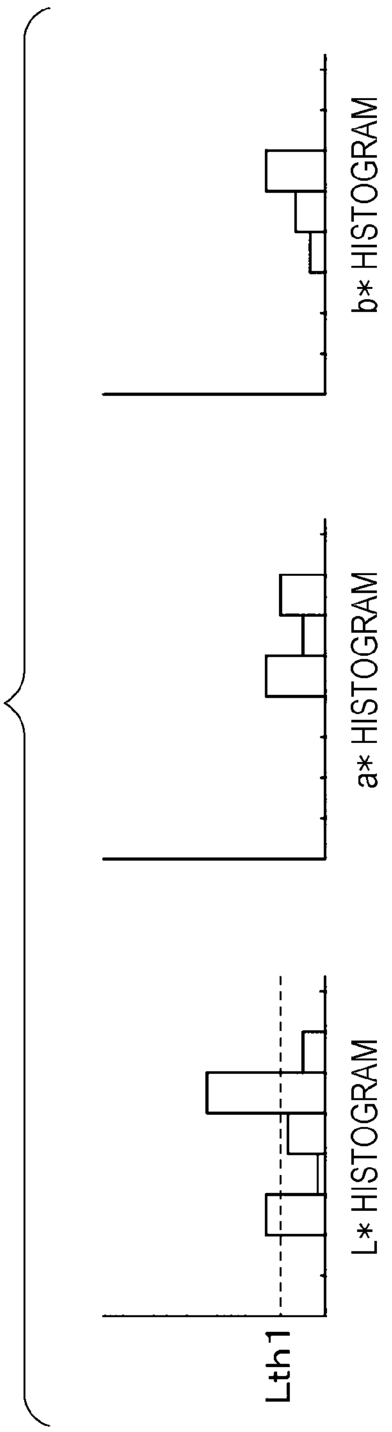
FIG. 6B is L*, a*, and b* histograms obtained from image information regarding a CIELAB color space obtained by reading the document illustrated in FIG. 6A.

When a document 154 is a colored sheet (e.g., a pink sheet) with letters thereon (e.g., blue letters) as illustrated in FIG. 6A, for example, the number of peaks that exceed the threshold Lth1 in the L* histogram is two as illustrated in FIG. 6B. The blank sheet determination section 98 of the control unit 50, therefore, determines that the document 154 is a non-blank sheet. If it is determined that the number of peaks that exceed the threshold Lth1 is two or more in the L* histogram, the number of black spots is not counted in the L* pixel count table, and the blank sheet determination section 98 determines that the document 154 is a non-blank sheet.

Figure 7A:
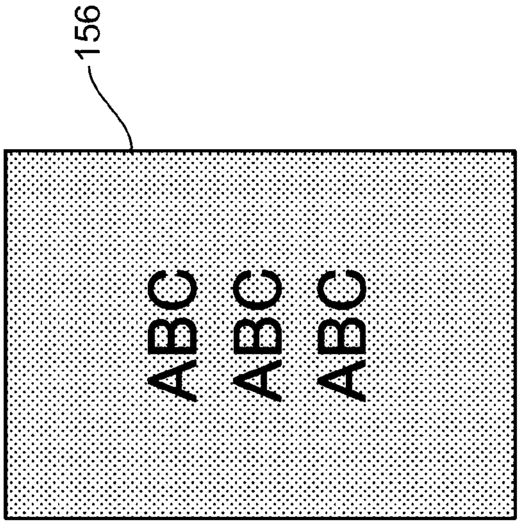
FIG. 7A is a diagram illustrating another example of the document to be read.
Figure 7B:
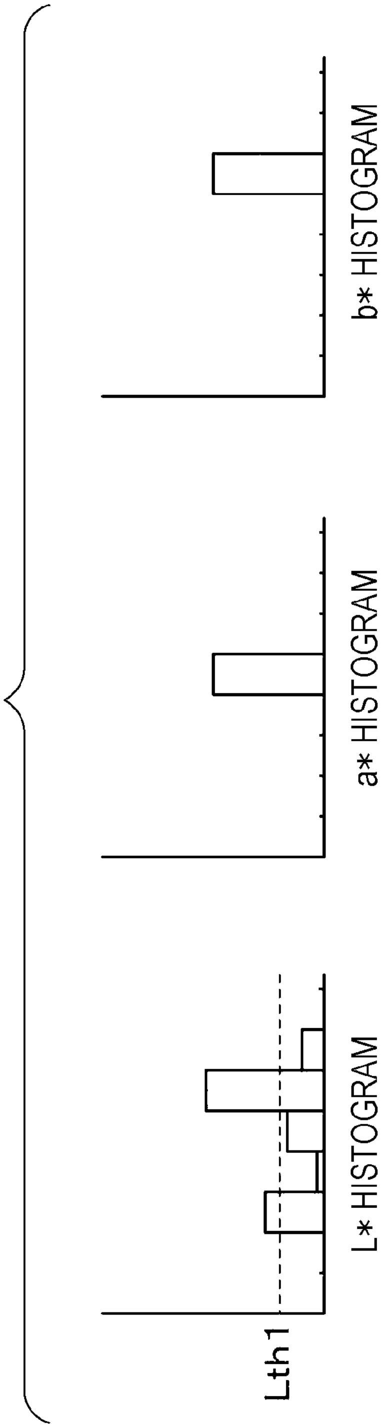
FIG. 7B is L*, a*, and b* histograms obtained from image information regarding a CIELAB color space obtained by reading the document illustrated in FIG. 7A.

When a document 156 is a colored sheet (e.g., a pink sheet) with letters thereon (e.g., red letters) as illustrated in FIG. 7A, for example, the number of peaks that exceed the threshold Lth1 in the L* histogram is two as illustrated in FIG. 7B. The blank sheet determination section 98 of the control unit 50, therefore, determines that the document 156 is a non-blank sheet.

Figure 8A:
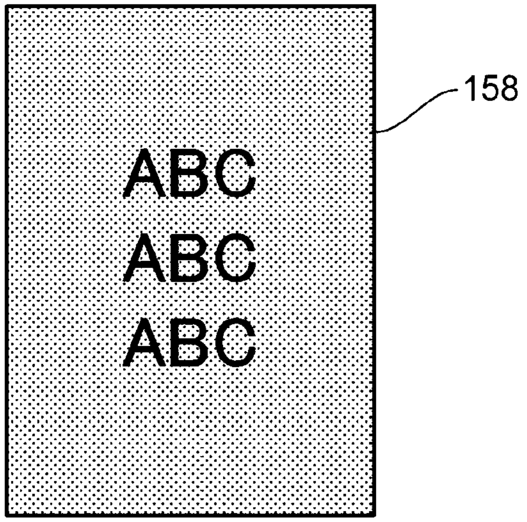
FIG. 8A is a diagram illustrating another example of the document to be read.
Figure 8B:
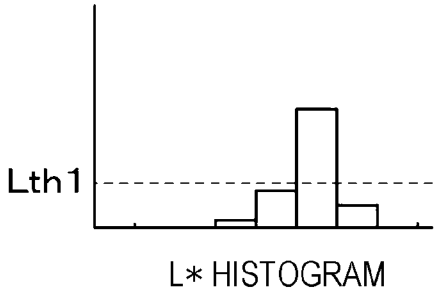
FIG. 8B is L*, a*, and b* histograms obtained from image information regarding a CIELAB color space obtained by reading the document illustrated in FIG. 8A.
Figure 8C:
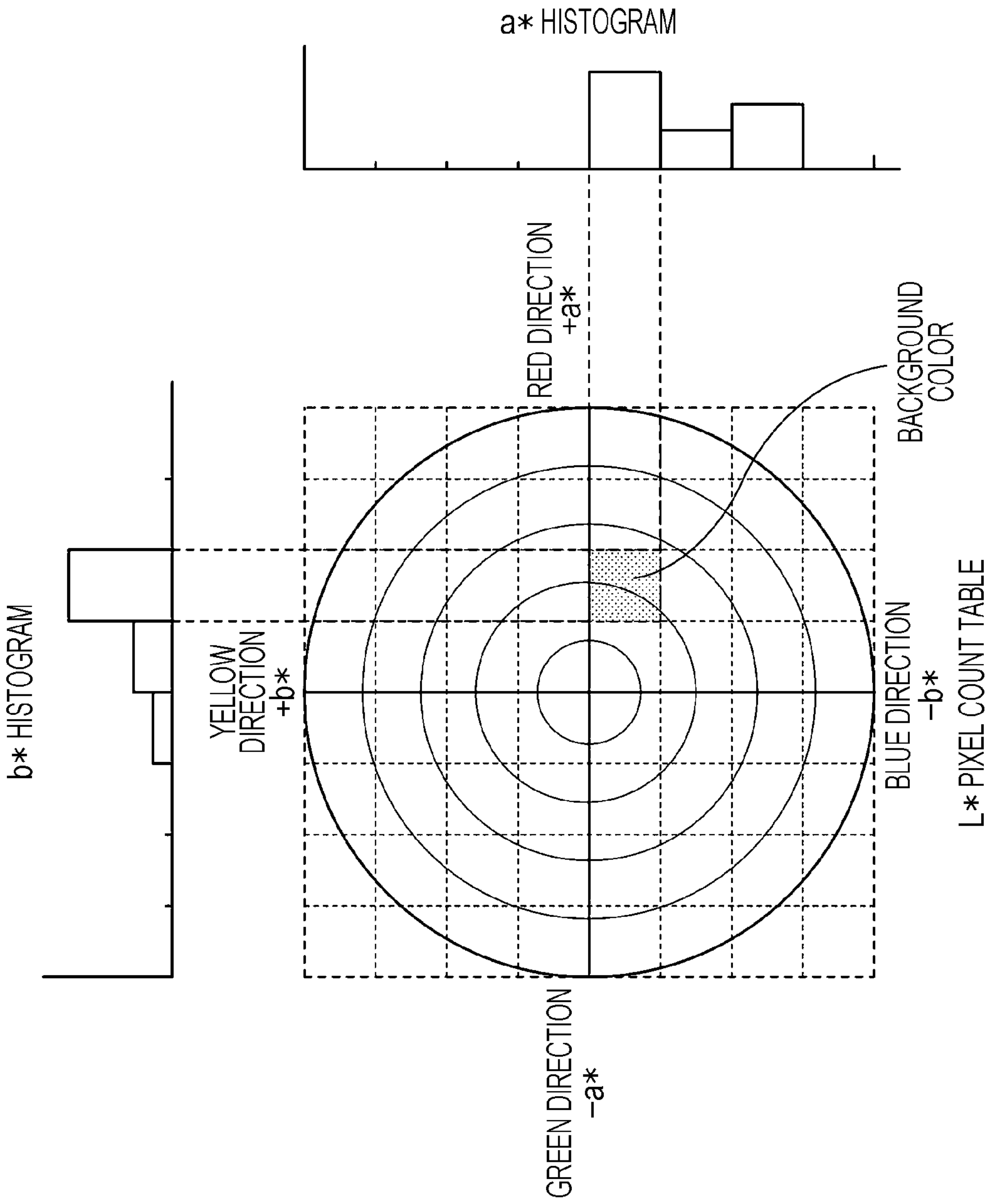
FIG. 8C is a diagram illustrating an a*b*-plane two-dimensional histogram and an L* pixel count table obtained from the image information regarding the CIELAB color space of the read document.

When a document 158 is a colored sheet (e.g., a pink sheet) with letters thereon (e.g., light blue letters) (i.e., when similar luminance values are observed in the case of a colored sheet and colored letters) as illustrated in FIG. 8A, for example, the number of peaks that exceed the threshold Lth1 in the L* histogram is one as illustrated in FIG. 8B. As illustrated in FIG. 8C, a background color is obtained from an intersection in the L* pixel count table between a highest peak of the a* histogram and a highest peak of the b* histogram. The number of black spots in a bin area determined to include the background color is then subtracted from the total number of black spots in all bin areas. Because an obtained value is larger than the predetermined threshold Cth in the document 158, the blank sheet determination section 98 of the control unit 50 determines that the document 158 is a non-blank sheet.

Figure 9A:
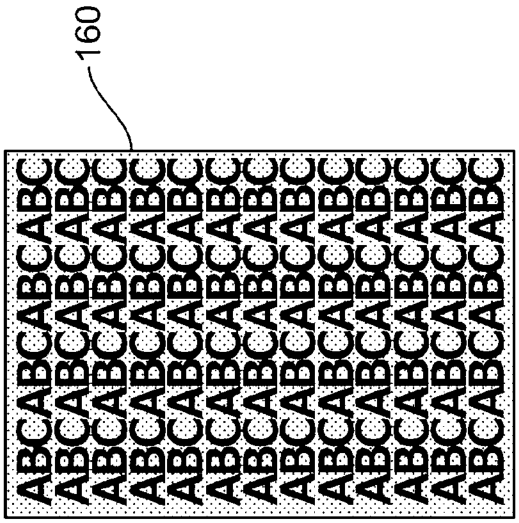
FIG. 9A is a diagram illustrating another example of the document to be read.
Figure 9B:
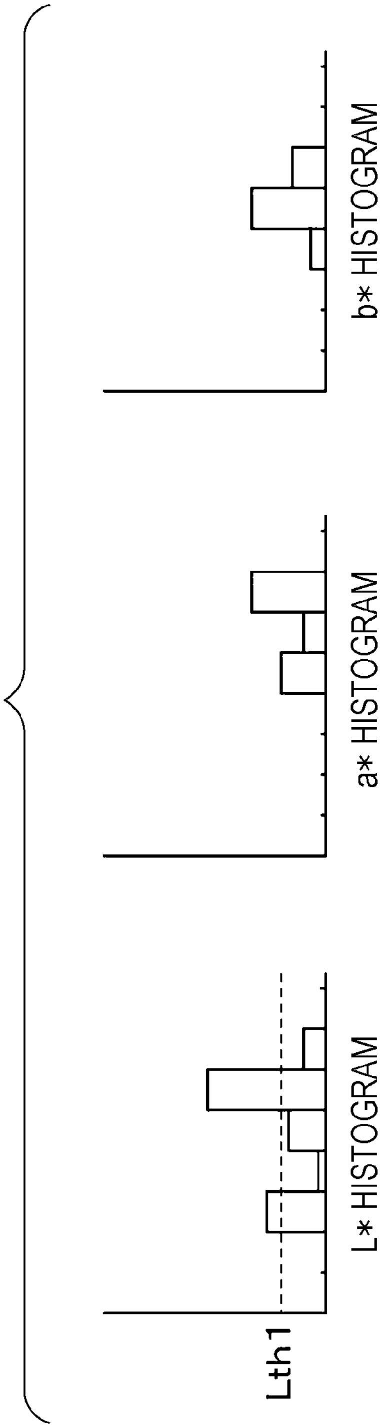
FIG. 9B is L*, a*, and b* histograms obtained from image information regarding a CIELAB color space obtained by reading the document illustrated in FIG. 9A.

When a document 160 is a colored sheet (e.g., a pink sheet) with letters thereon (e.g., blue letters) (when letters occupy an area larger than that of a background color) as illustrated in FIG. 9A, for example, the number of peaks that exceed the threshold Lth1 in the L* histogram is two as illustrated in FIG. 9B. The blank sheet determination section 98 of the control unit 50, therefore, determines that the document 160 is a non-blank sheet.

Figure 10:
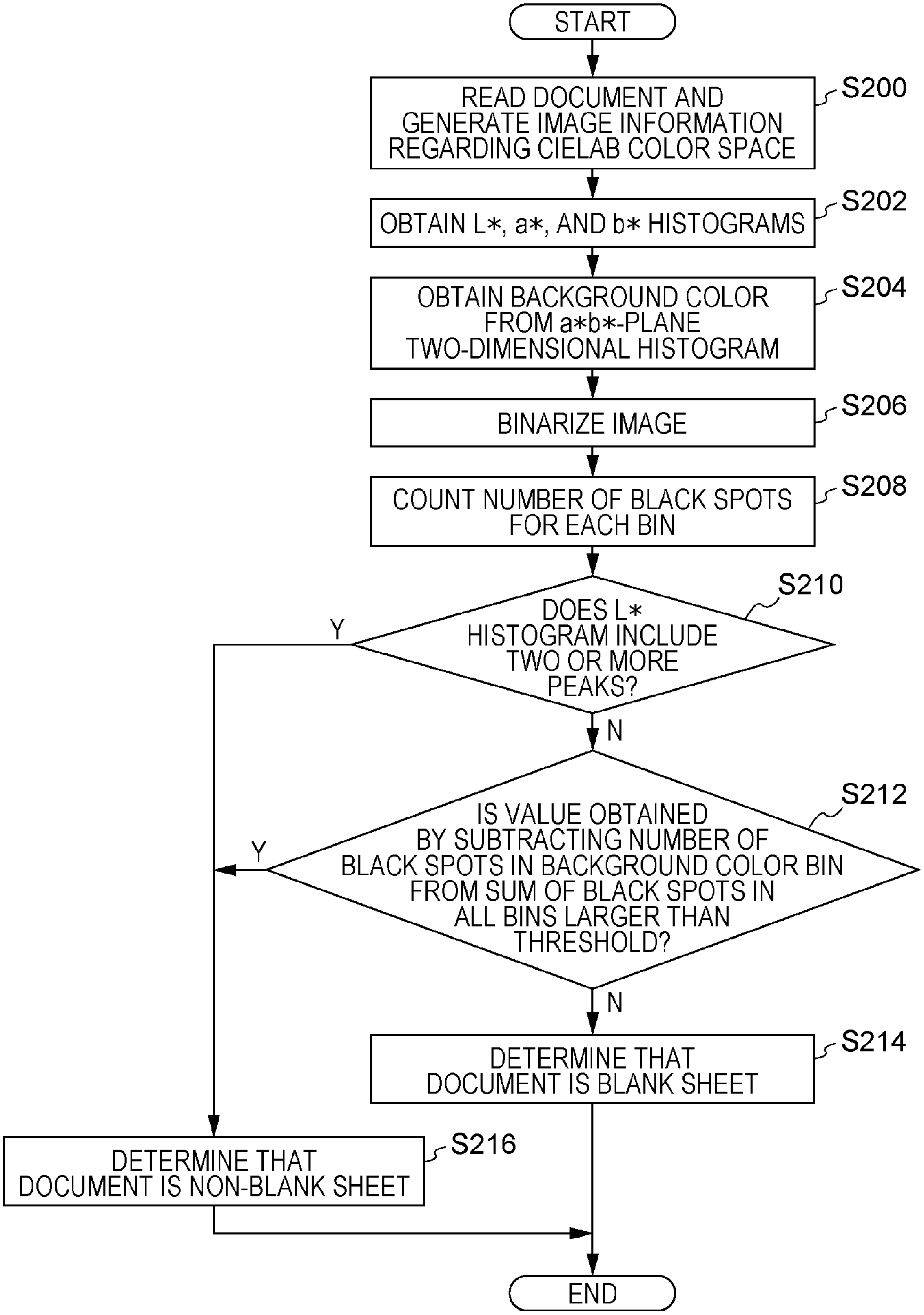
FIG. 10 is a flowchart illustrating an example of a process performed by a control unit of the image forming apparatus according to the exemplary embodiment.

Next, a specific process performed by the image forming apparatus 20 according to the present exemplary embodiment configured as described above will be described. FIG. 10 is a flowchart illustrating an example of a process performed by the control unit 50 of the image forming apparatus 20 according to the present exemplary embodiment. The process illustrated in FIG. 10 starts when, for example, the user inputs a predetermined command for image information using the user interface 34. The image information may be image information obtained by reading a document using the document optical reading unit 60 or image information obtained by reading a document using the document optical reading unit 60 and saved to the storage unit 52 in advance.

In step S200, the CPU 50A generates image information regarding a CIELAB color space of the document 150 read by the document optical reading unit 60 and proceeds to step S202.

In step S202, the CPU 50A obtains L*, a*, and b* histograms. That is, the CPU 50A creates the L* histogram, the a* histogram, and the b* histogram. The CPU 50A also creates an a*b*-plane two-dimensional histogram. The CPU 50A then proceeds to step S204.

In step S204, the CPU 50A obtains a background color from the a*b*-plane two-dimensional histogram. More specifically, the CPU 50A determines, as a background color of a document image, a color included in a bin area of the two-dimensional histogram located at an intersection between a highest peak of the a* histogram and a highest peak of the b* histogram. The CPU 50A then proceeds to step S206.

In step S206, the CPU 50A binarizes the document image and proceeds to step S208.

In step S208, the CPU 50A counts the number of black spots in each of bin areas of the a*b*-plane two-dimensional histogram.

In step S210, the CPU 50A determines whether the L* histogram includes two or more bins where the frequency exceeds the threshold Lth1. In other words, the CPU 50A determines whether the L* histogram includes two or more peaks that exceed the threshold Lth1. If the L* histogram includes two or more bins where the frequency exceeds the threshold Lth1, the CPU 50A proceeds to step S216, and if the number of such bins is one, the CPU 50A proceeds to step S214.

In step S212, the CPU 50A subtracts, in the a*b*-plane two-dimensional histogram, the number of black spots in the bin area determined to include the background color from the total number of black spots in all the bin areas and determines whether an obtained value is larger than the predetermined threshold Cth. If the obtained value is larger than the predetermined threshold Cth, the CPU 50A proceeds to step S216, and if the obtained value is smaller than or equal to the predetermined threshold Cth, the CPU 50A proceeds to step S214.

In step S214, the CPU 50A determines that the document 150 is a blank sheet and ends the process.

In step S216, the CPU 50A determines that the document 150 is a non-blank sheet and ends the process.

Figure 12:
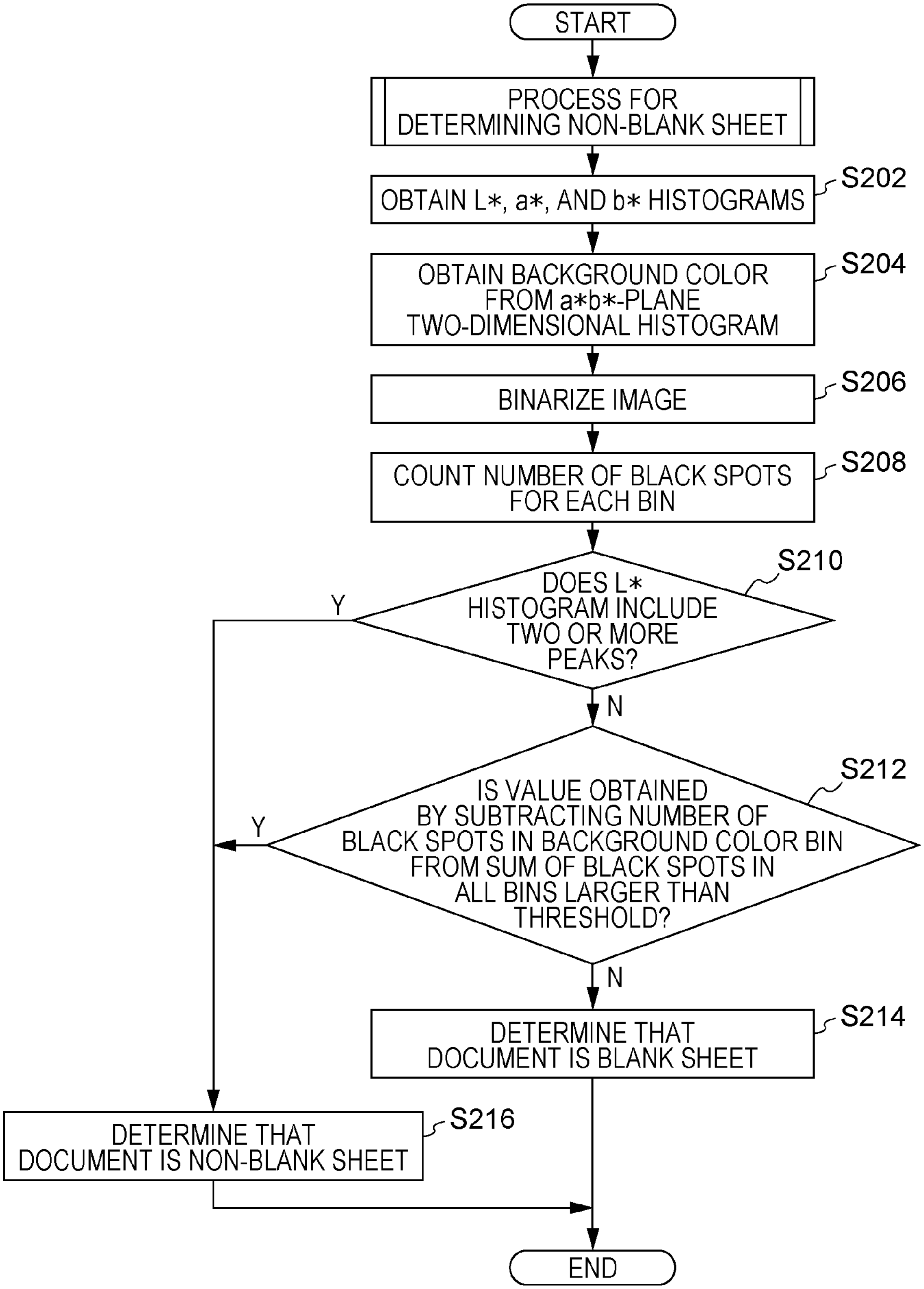
FIG. 12 is a flowchart illustrating a modification of the process performed by the control unit of the image forming apparatus according to the present exemplary embodiment.

Next, modifications of the process performed by the control unit 50 of the image forming apparatus 20 according to the present exemplary embodiment will be described. FIG. 12 is a flowchart illustrating one of the modifications of the process performed by the control unit 50 of the image forming apparatus 20 according to the present exemplary embodiment. The same steps as in FIG. 10 are given the same reference numerals, and detailed description thereof is omitted.

Figure 11A:
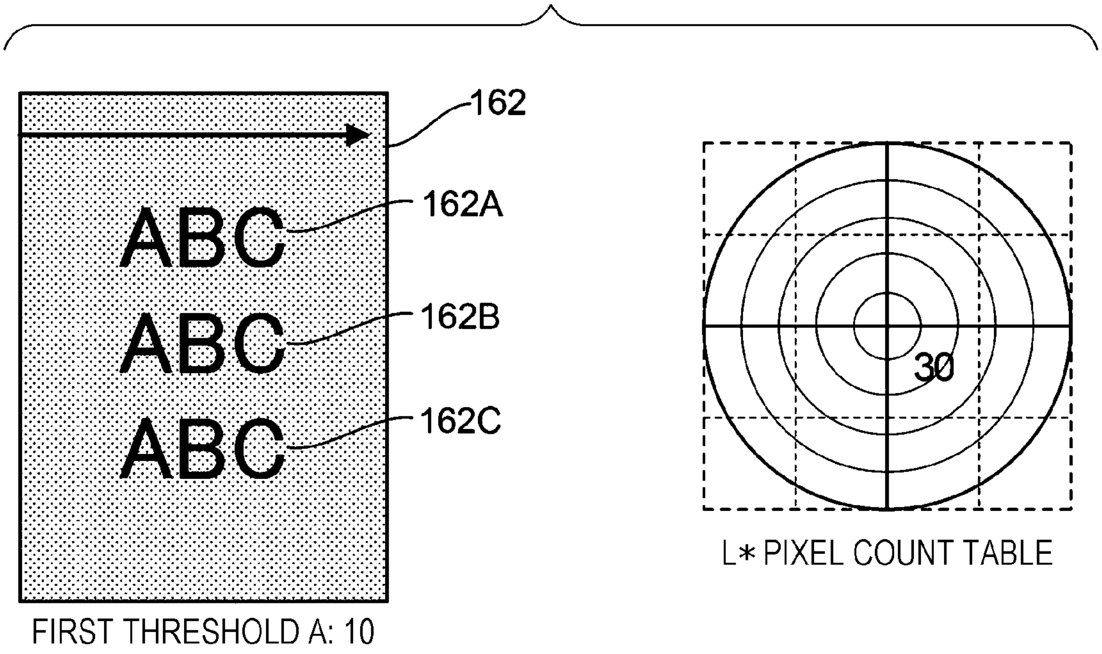
FIG. 11A is a diagram illustrating a state where a blank part of a document to be read is being scanned.
Figure 11B:
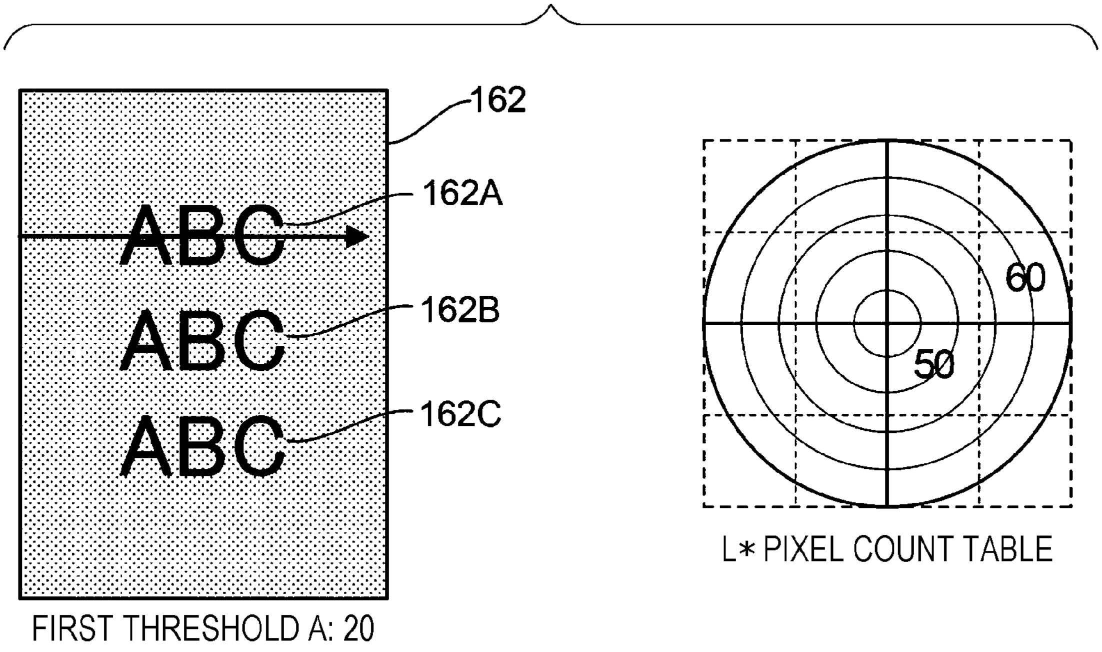
FIG. 11B is a diagram illustrating a state where a letter part of the document to be read is being scanned.
Figure 11C:
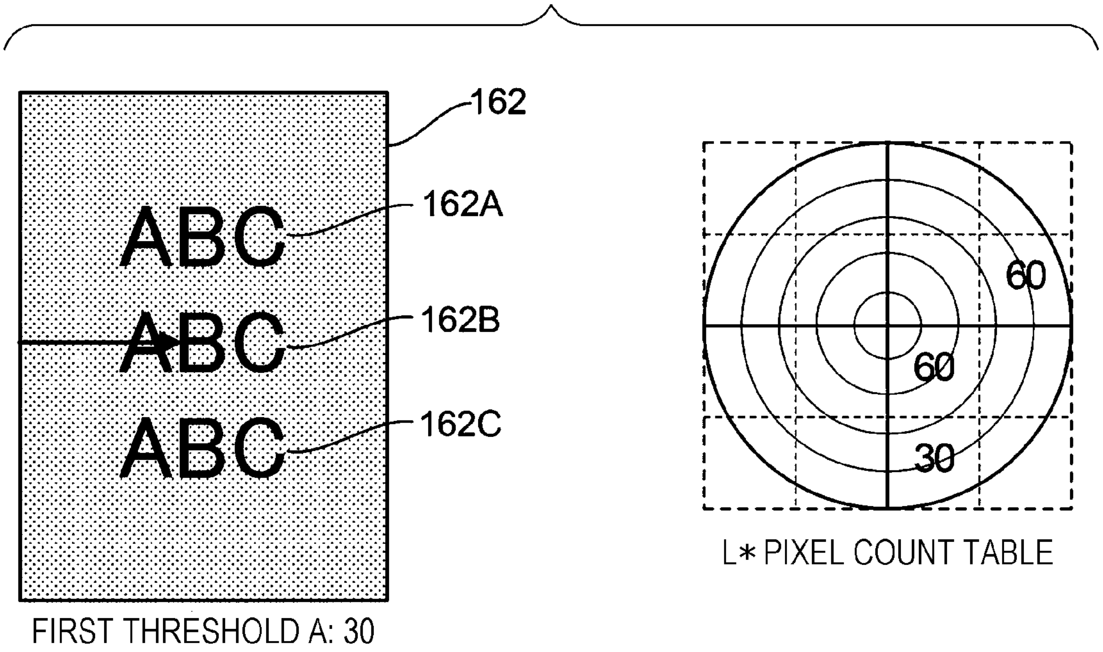
FIG. 11C is a diagram illustrating another state where the letter part of the document to be read is being scanned.
Figure 13:
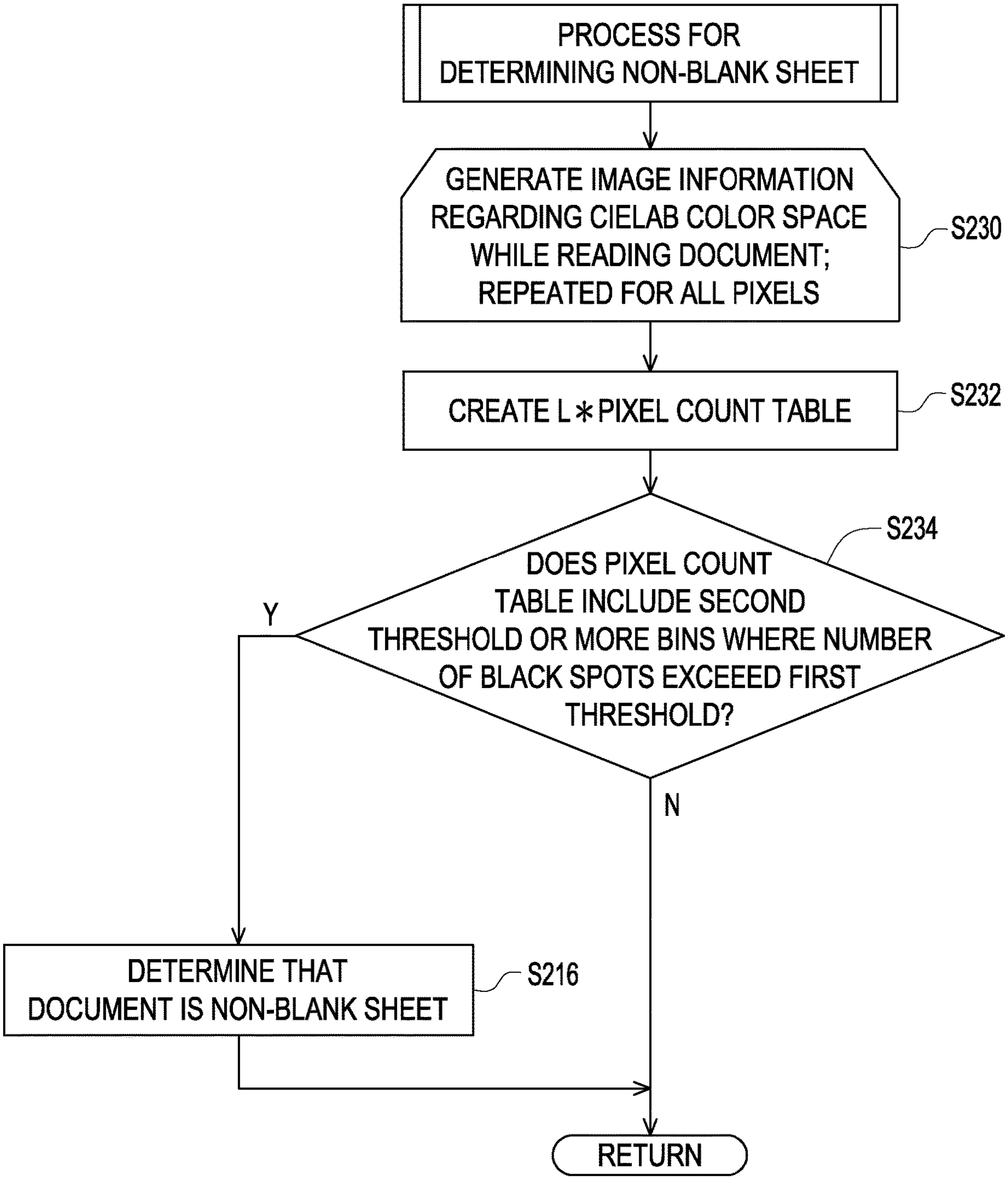
FIG. 13 is a flowchart illustrating a process for determining a blank sheet according to a modification.

In this modification, a process for determining a non-blank sheet illustrated in FIG. 12 replaces step S200. The process for determining a non-blank sheet includes, as illustrated in FIG. 13, steps S230, S232, and S234. In step S230, image information regarding a CIELAB color space is generated while reading a document. More specifically, as illustrated in FIGS. 11A to 11C, image information regarding a CIELAB color space is generated while scanning a document 162. As illustrated in FIGS. 11A to 11C, the document 162 is gradually scanned from a start point to an end point on the document 162. Since a blank part of the document 162 is scanned in FIG. 11A, the number of black spots is counted in one of the bin areas of the L* pixel count table. Since a letter part 162A (e.g., red letters) of the document 162 is scanned in FIG. 11B, the number of black spots is counted in two of the bin areas of the L* pixel count table. Since a letter part 162B (e.g., blue letters) of the document 162 is scanned in FIG. 11C, the number of black spots is counted in three of the bin areas of the L* pixel count table. If there are a second threshold (three in FIG. 11C) bin areas where the number of black spots exceeds a predetermined first threshold (30 in FIG. 11C), the document 162 is determined as a non-blank sheet. That is, in the process for determining a non-blank sheet illustrated in FIG. 13, the L* pixel count table is created in step S232. The number of black spots is then counted in the L* pixel count table for each scanning operation, and if there are the second threshold or more bin areas where the number of black spots exceeds the predetermined first threshold in step S234, the document may be determined as a non-blank sheet in step S216. A document might thus be determined as a non-blank sheet before scanning is completed, thereby finishing the process for determining a non-blank sheet more rapidly for a document.

In the process illustrated in FIG. 10, the following step may be added after step S212. In this step, for example, the CPU 50A determines whether L* of a bin including a peak is a maximum value in the L* histogram. If determining in this step that L* of the bin including a peak is the maximum value in the L* histogram, the CPU 50A proceeds to step S214, and if determining that L* of the bin including a peak is not the maximum value, the CPU 50A proceeds to step S216.

Steps S210 and S212 may be switched as necessary.

Figure 14:
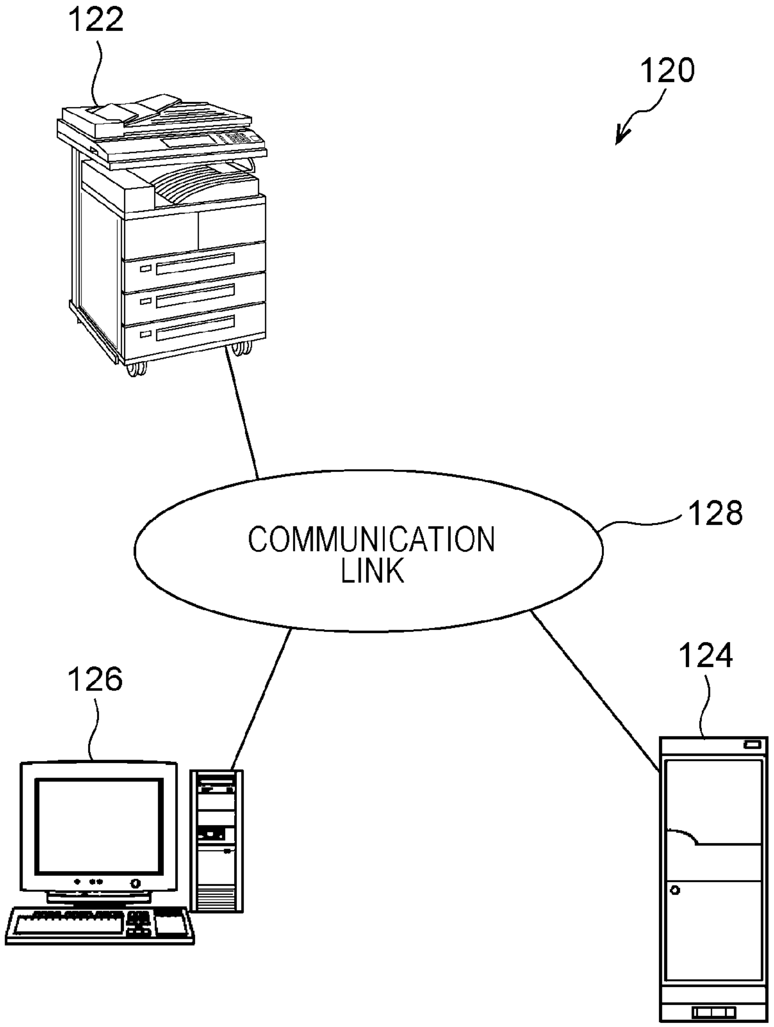
FIG. 14 is a diagram illustrating a modification of the image forming system according to the exemplary embodiment.

Although an example where the image forming apparatus 20 performs the processes illustrated in FIGS. 10 and 12 has been described in the above exemplary embodiment, the processes illustrated in FIGS. 10 and 12 need not be performed by the image forming apparatus 20. As illustrated in FIG. 14, for example, an image processing system 120 where an image forming apparatus 122 and at least a server 124, such as a client server, or a client computer 126 are connected to a communication link 128 may be used, instead. In this case, the server 124 or the client computer 126 may perform at least one of the processes illustrated in FIGS. 10 and 12 using the image forming apparatus 122 as an image reading apparatus and the server 124 or the client computer 126 as an image processing apparatus. In the case of an image forming system including both the server 124 and the client computer 126, the server 124 and the client computer 126 may operate together to perform the processes illustrated in FIGS. 10 and 12.

Figure 15:
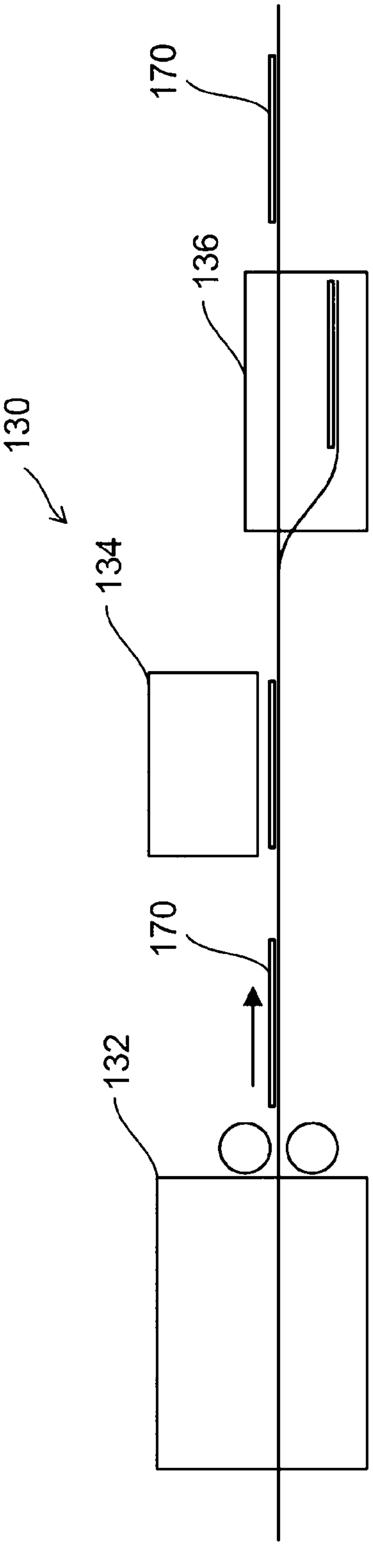
FIG. 15 is a diagram illustrating another modification of the image forming system according to the exemplary embodiment.

Although an example where the image forming apparatus 20, which is an example of the image processing system, performs the processes illustrated in FIGS. 10 and 12 has been described in the above exemplary embodiment, the image forming apparatus 20 is not limited to this. As illustrated in FIG. 15, for example, an image processing system 130 may include an image forming apparatus 132, an image checking apparatus 134, and a blank sheet removal unit 136. The image forming apparatus 132 discharges downstream a document 170 on which an image has been formed. The image checking apparatus 134 reads the image on the document 170 and checks the image. More specifically, the image checking apparatus 134 determines whether the document 170 is a blank sheet. If the image checking apparatus 134 determines that the document 170 is a non-blank sheet, the blank sheet removal unit 136 removes the document 170 from a sheet conveying path. As a result, blank sheets are not conveyed downstream. A control unit in the image processing system 130 may be incorporated into the image checking apparatus 134, the image forming apparatus 132, or the blank sheet removal unit 136.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processes performed by the image forming apparatus 20 according to the above exemplary embodiment may be achieved by software, hardware, or a combination of software and hardware. The processes performed by the image forming apparatus 20 may be stored in a storage medium as programs and distributed.

The present disclosure is not limited to the above description, and may be modified in various ways and implemented without deviating from the scope thereof.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image processing system including:

an image reader that reads a document image and that generates image information regarding a CIELAB color space; and a processor configured to:

obtain an a*b*-plane two-dimensional histogram for the image information;

obtain a background color of the document image using the a*b*-plane two-dimensional histogram and count a number of black spots of the image information for each of bins of the a*b*-plane two-dimensional histogram;

subtract the number of black spots in a bin determined to include the background color from a total number of black spots in all the bins; and determine, if an obtained value is larger than a predetermined threshold, that the document image indicates a non-blank sheet.

(((2)))

The image processing system according to (((1))), in which the processor is configured to obtain an L* histogram, and in which the processor is configured to determine a number of peaks in the L* histogram and determine, if the number of peaks is two or more, that the document image indicates a non-blank sheet.

(((3)))

The image processing system according to (((1))), in which the processor is configured to obtain an L* histogram, and in which the processor is configured to determine a number of peaks in the L* histogram and determine, if the number of peaks is one and the obtained value is smaller than or equal to the predetermined threshold, that the document image indicates a blank sheet.

(((4)))

The image processing system according to any of (((1))) to (((3))), in which the processor is configured to determine, as the background color of the document image, a color included in a bin of the a*b*-plane two-dimensional histogram located at an intersection between a highest peak of an a* histogram and a highest peak of a b* histogram.

(((5)))

The image processing system according to any of (((1))) to (((4))), in which the processor is configured to determine, if the a*b*-plane two-dimensional histogram includes a second threshold or more bins where the number of black spots exceeds a first threshold, that the document image indicates a non-blank sheet.

(((6)))

The image processing system according to (((5))), in which the processor is configured to count, as the document image is read in a scanning direction, the number of black spots of the image information for each of the bins of the a*b*-plane two-dimensional histogram obtained for the image information.

(((7)))

A program causing a computer to execute a process for processing an image, the process including:

reading a document image and generating image information regarding a CIELAB color space;

obtaining an a*b*-plane two-dimensional histogram for the image information;

obtaining a background color of the document image using the a*b*-plane two-dimensional histogram and counting a number of black spots of the image information for each of bins of the a*b*-plane two-dimensional histogram;

subtracting the number of black spots in a bin determined to include the background color from a total number of black spots in all the bins; and determining, if an obtained value is larger than a predetermined threshold, that the document image indicates a non-blank sheet.

What is claimed is:

1. An image processing system comprising:

an image reader that reads a document and that generates image information regarding a CIELAB color space; and a processor configured to:

obtain an a*b*-plane two-dimensional histogram for the image information;

obtain a background color of the document using the a*b*-plane two-dimensional histogram and count a number of black spots of the image information for each of bins of the a*b*-plane two-dimensional histogram;

obtain a value by subtracting the number of black spots in a bin determined to include the background color from a total number of black spots in all the bins; and determine, if an obtained value is larger than a predetermined threshold, that the document is a non-blank sheet.

2. The image processing system according to claim 1, wherein the processor is configured to obtain an L* histogram, and wherein the processor is configured to determine a number of peaks in the L* histogram and determine, if the number of peaks is two or more, that the document is a non-blank sheet.

3. The image processing system according to claim 1, wherein the processor is configured to obtain an L* histogram, and wherein the processor is configured to determine a number of peaks in the L* histogram and determine, if the number of peaks is one and the obtained value is smaller than or equal to the predetermined threshold, that the document is a blank sheet.

4. The image processing system according to claim 1, wherein the processor is configured to determine, as the background color of the document, a color included in a bin of the a*b*-plane two-dimensional histogram located at an intersection between a highest peak of an a* histogram and a highest peak of a b* histogram.

5. The image processing system according to claim 1, wherein the processor is configured to determine, if the a*b*-plane two-dimensional histogram includes a second threshold or more bins where the number of black spots exceeds a first threshold, that the document is a non-blank sheet.

6. The image processing system according to claim 5, wherein the processor is configured to count, as the document is read in a scanning direction, the number of black spots of the image information for each of the bins of the a*b*-plane two-dimensional histogram obtained for the image information.

7. A non-transitory computer readable medium storing a program causing a computer to execute a process for processing an image, the process comprising:

reading a document and generating image information regarding a CIELAB color space;

obtaining an a*b*-plane two-dimensional histogram for the image information;

obtaining a background color of the document using the a*b*-plane two-dimensional histogram and counting a number of black spots of the image information for each of bins of the a*b*-plane two-dimensional histogram;

obtaining a value by subtracting the number of black spots in a bin determined to include the background color from a total number of black spots in all the bins; and determining, if an obtained value is larger than a predetermined threshold, that the document is a non-blank sheet.

8. A method for processing an image, the method comprising:

reading a document and generating image information regarding a CIELAB color space;

obtaining an a*b*-plane two-dimensional histogram for the image information;

obtaining a background color of the document using the a*b*-plane two-dimensional histogram and counting a number of black spots of the image information for each of bins of the a*b*-plane two-dimensional histogram;

obtaining a value by subtracting the number of black spots in a bin determined to include the background color from a total number of black spots in all the bins; and determining, if an obtained value is larger than a predetermined threshold, that the document is a non-blank sheet.

* * * * *